(12) United States Patent
Danilov et al.

(10) Patent No.: US 11,347,419 B2
(45) Date of Patent: May 31, 2022

(54) VALENCY-BASED DATA CONVOLUTION FOR GEOGRAPHICALLY DIVERSE STORAGE

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 329 days.

(21) Appl. No.: 16/743,397

(22) Filed: Jan. 15, 2020

(65) Prior Publication Data

US 2021/0216207 A1 Jul. 15, 2021

(51) Int. Cl.
*G06F 3/06* (2006.01)
*G06N 20/00* (2019.01)
*G06F 9/30* (2018.01)

(52) U.S. Cl.
CPC .............. *G06F 3/064* (2013.01); *G06F 3/067* (2013.01); *G06F 3/0611* (2013.01); *G06F 9/30029* (2013.01); *G06N 20/00* (2019.01)

(58) Field of Classification Search
USPC ......... 707/641, 665–673, 693; 711/161, 162; 714/6.1–6.3
See application file for complete search history.

(56) References Cited

U.S. PATENT DOCUMENTS

| | | | |
|---|---|---|---|
| 2016/0371145 A1* | 12/2016 | Akutsu | G06F 11/1076 |
| 2018/0181324 A1* | 6/2018 | Danilov | G06F 3/0631 |
| 2019/0044853 A1* | 2/2019 | Raghunath | G06F 3/0658 |
| 2020/0250035 A1* | 8/2020 | Anderson | H04L 1/0043 |

* cited by examiner

*Primary Examiner* — Ilwoo Park
(74) *Attorney, Agent, or Firm* — Amin, Turocy & Watson, LLP

(57) ABSTRACT

Data convolution for geographically diverse storage is disclosed, wherein the data convolution is based on a valency metric, determination, parameter, etc. Valency can be correlated to a data object and can be inherited by a chunk comprising the data object. Valency can indicate permitted levels of convolution for a chunk. A chunk resulting from convolving at least two other contributing/participating chunks can be determined to have a valency that can be less than either of the two contributing/participating chunks. A chunk with a zero valence can be restricted from contributing to a convolution. Where the at least two other chunks both have infinite valency, the resulting convolved chunk can also have infinite valency. A chunk resulting from convolving participating chunks having mixed valency values can be reconvolved. Valency can enable orchestrating convolution of chunks, for example, to conserving storage space, mitigate computing resource consumption, etc.

20 Claims, 10 Drawing Sheets

| TIME | CHUNK(S) | | | |
|---|---|---|---|---|
| T=1 | CHUNK A [0] 510 | | | |
| T=2 | CHUNK A [0] 510 | CHUNK B [3] 511 | | |
| T=3 | CHUNK A [0] 510 | CHUNK B [3] 511 | CHUNK C [3] 512 | |
| T=4 | CHUNK A [0] 510 | CHUNK BC [2] 542 | | |
| T=5 | CHUNK A [0] 510 | CHUNK BC [2] 522 | CHUNK D [INF] 513 | |
| T=6 | CHUNK A [0] 510<br>CHUNK E [0] 514 | CHUNK BC [2] 522 | CHUNK D [INF] 513 | |
| T=7 | CHUNK A [0] 510<br>CHUNK E [0] 514 | CHUNK BC [2] 522<br>CHUNK F [INF] 515 | CHUNK D [INF] 513 | |
| T=8 | CHUNK A [0] 510<br>CHUNK E [0] 514 | CHUNK BC [2] 522 | CHUNK DF [INF] 543 | |
| T=9 | CHUNK A [0] 510<br>CHUNK E [0] 514<br>CHUNK I [7] 518 | CHUNK BC [2] 542<br>CHUNK G [9] 516 | CHUNK DF [INF] 543<br>CHUNK H [8] 517 | |
| T=10 | CHUNK A [0] 510<br>CHUNK E [0] 514 | CHUNK BC [2] 542<br>CHUNK GHI [6, 8*,9*] 546 | CHUNK DF [INF] 543 | |
| ⋮ | ⋮ | | | |

FIG. 5

| TIME | CHUNK(S) | | |
|---|---|---|---|
| T=1 | CHUNK A [0] 610 | CHUNK BC [2] 642 | CHUNK DF [INF] 643 |
| | CHUNK E [0] 614 | CHUNK GHI [6, 8*,9*] 646 | |
| T=2 | CHUNK A [0] 610 | CHUNK BC [2] 642 | CHUNK DF [INF] 643 |
| | CHUNK E [0] 614 | CHUNK GHI [6, 8*,9*] 646 | |
| | CHUNK J [7] 650 | | |
| T=3 | CHUNK A [0] 610 | CHUNK BC [2] 642 | CHUNK DF [INF] 643 |
| | CHUNK E [0] 614 | CHUNK G [9] 651 | CHUNK H [8] 652 |
| | CHUNK J [7] 650 | | CHUNK I [7] 653 |
| T=4 | CHUNK A [0] 610 | CHUNK BC [2] 642 | CHUNK DF [INF] 643 |
| | CHUNK E [0] 614 | CHUNK G [9] 651 | CHUNK H [8] 652 |
| | CHUNK IJ [6] 654 | | |
| T=5 | CHUNK A [0] 610 | CHUNK BC [2] 642 | CHUNK DF [INF] 643 |
| | CHUNK E [0] 614 | CHUNK G [9] 651 | CHUNK H [8] 652 |
| | CHUNK IJ [6] 654 | CHUNK K [8] 660 | |
| T=6 | CHUNK A [0] 610 | CHUNK BC [2] 642 | CHUNK DF [INF] 643 |
| | CHUNK E [0] 614 | CHUNK G [9] 651 | |
| | CHUNK IJ [6] 654 | CHUNK HK [7] 661 | |

FIG. 6

VALENCY-BASED DATA CONVOLUTION FOR GEOGRAPHICALLY DIVERSE STORAGE

TECHNICAL FIELD

The disclosed subject matter relates to data convolution, and, more particularly, to convolving data among geographically diverse storage devices based on data valency values.

BACKGROUND

Conventional data storage techniques can employ convolution and deconvolution of data to conserve storage space. As an example, convolution can allow data to be packed or hashed in a manner that uses less space that the original data. Moreover, convolved data, e.g., a convolution of first data and second data, etc., can typically be de-convoled to the original first data and second data. One use of data storage is in bulk data storage.

BRIEF DESCRIPTION OF DRAWINGS

FIG. 5 illustrates an example system state(s) for an example system facilitating data convolution for geographically diverse storage based on data valency, in accordance with aspects of the subject disclosure.

FIG. 6 illustrates an example system state(s) for an example system facilitating data re-convolution for geographically diverse storage based on data valency, in accordance with aspects of the subject disclosure.

DETAILED DESCRIPTION

Figure 1:
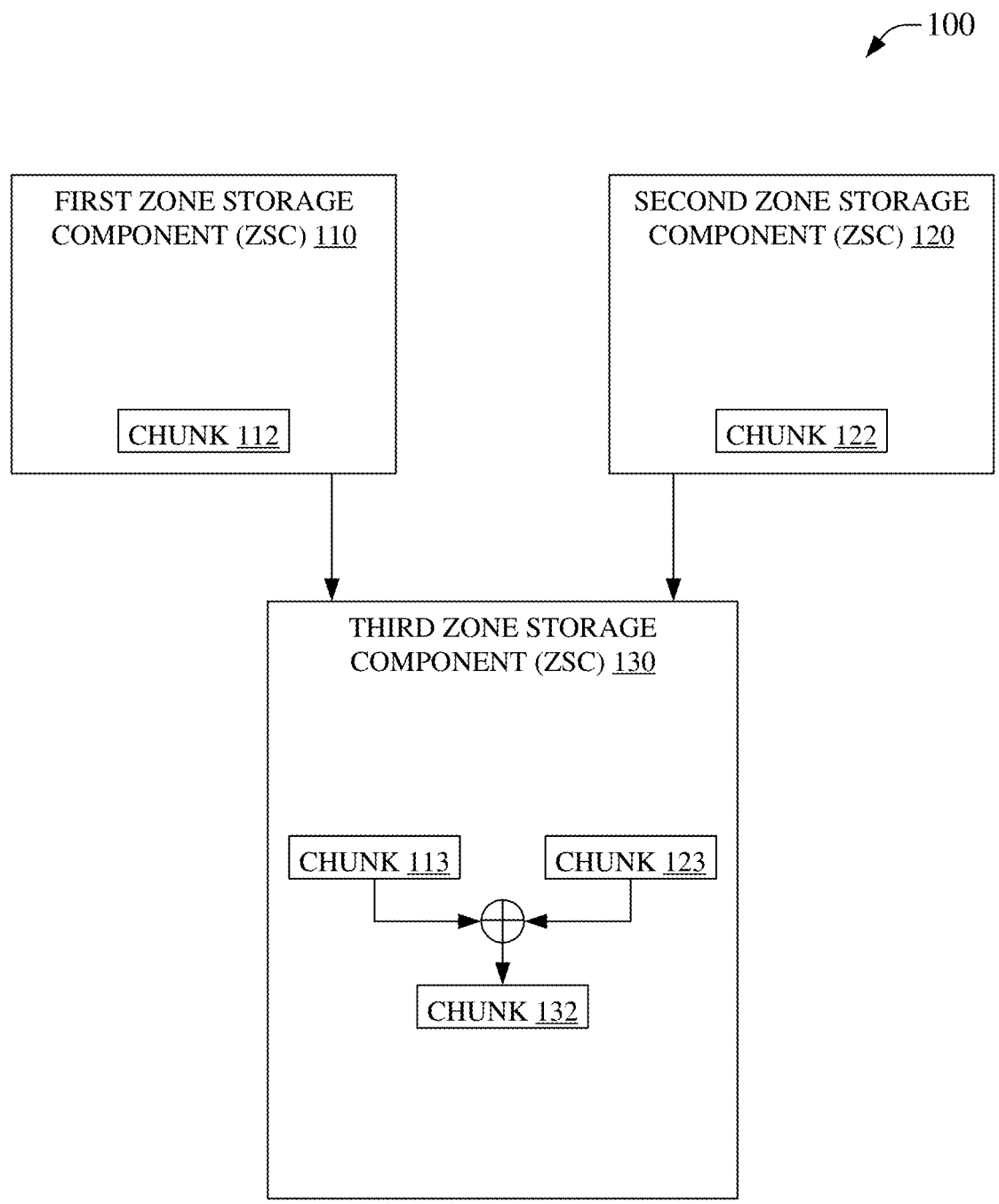
FIG. 1 is an illustration of an example system that can facilitate data convolution for geographically diverse storage, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can employ convolution and deconvolution to conserve storage space. As an example, convolution can allow data to be packed or hashed in a manner that uses less space that the original data. Moreover, convolved data, e.g., a convolution of first data and second data, etc., can typically be de-convoled to the original first data and second data. One use of data storage is in bulk data storage. Examples of bulk data storage can include networked storage, e.g., cloud storage, for example ECS, formerly 'Elastic Cloud Storage,' offered by Dell EMC. Bulk storage can, in an aspect, manage disk capacity via partitioning of disk space into blocks of fixed size, frequently referred to as chunks, for example a 128 MB chunk, etc. Chunks can be used to store user data, and the chunks can be shared among the same or different users, for example, one chunk may contain fragments of several user objects. A chunk's content can generally be modified in an append-only mode to prevent overwriting of data already added to the chunk. As such, when a typical chunk becomes full enough, it can be sealed so that the data therein is generally not able for further modification. These chunks can be then stored in a geographically diverse manner to allow for recovery of the data where a first copy of the data is destroyed, e.g., disaster recovery, etc. Blocks of data, hereinafter 'data chunks', 'journal chunks', 'convolved chunks', or simply 'chunks' unless otherwise explicitly or implicitly directed to a specific type of chunk, can be used to store user data, facilitate storage of user data, enable protection of user data, etc. Chunks can be shared among the same or different users, e.g., a typical data chunk can contain fragments of different user data objects, a typical journal chunk can store information facilitating geographically diverse, and/or convolved geographically diverse data storage, a typical convolved chunk can store information pertaining to portions of two or more data chunks, etc. Chunk contents can be modified, for example, in an append-only mode to prevent overwriting of data already added to the chunk, etc. As such, for a typical append-only chunk that is determined to be full, the data therein is generally not able to be further modified. Eventually the chunk can be stored 'off-site', e.g., in a geographically diverse manner, to provide for disaster recovery, etc. Chunks from a data storage device, e.g., 'zone storage component', 'zone storage device', etc., located in a first geographic location, hereinafter a 'zone', etc., can be stored in a second zone storage device that is located at a second geographic location different from the first geographic location. This can enable recovery of data where the first zone storage device is damaged, destroyed, offline, etc., e.g., disaster recovery of data, by accessing the off-site data from the second zone storage device.

Geographically diverse data storage can use data compression to store data. As an example, a storage device in Topeka can store a backup of data from a first zone storage device in Houston, e.g., Topeka can be considered geographically diverse from Houston. As a second example, data chunks from Seattle and San Jose can be stored in Denver. The example Denver storage can be compressed or uncompressed, wherein uncompressed indicates that the Seattle and San Jose chunks are replicated in Denver, and wherein compressed indicates that the Seattle and San Jose chunks are convolved, for example via an 'XOR' operation, into a different chunk to allow recovery of the Seattle or San Jose data from the convolved chunk, but where the convolved chunk typically consumes less storage space than the sum of the storage space for both the Seattle and San Jose chunks individually. In an aspect, compression can comprise convolving data and decompression can comprise deconvolving data, hereinafter the terms compress, compression, convolve, convolving, etc., can be employed interchangeably unless explicitly or implicitly contraindicated, and similarly, decompress, decompression, deconvolve, deconvolving, etc., can be used interchangeably. Compression, therefore, can allow original data to be recovered from a compressed chunk that consumes less storage space than storage of the uncompressed data chunks. This can be beneficial in that data from a location can be backed up by redundant data in another location via a compressed chunk, wherein a redundant data chunk can be smaller than the sum of the data chunks contributing to the compressed chunk. As such, local chunks, e.g., chunks from different zone storage devices, can be compressed via a convolution technique to reduce the amount of storage space used by a compressed chunk at a geographically distinct location.

A convolved chunk stored at a geographically diverse storage device can comprise data from some or all storage devices of a geographically diverse storage system. As an example, where there are five storage devices, a first storage device can convolve chunks from the other four storage devices to create a 'backup' of the data from the other four storage devices. In this example, the first storage device can create a backup chunk by convolving chunks received from the other four storage devices. In an aspect, this can result in generating copies of the four received chunks at the first storage device and then convolving the four chunks to generate a fifth chunk that is a backup of the other four chunks. Moreover, one or more other copies of the four chunks can be created at the first storage device for redundancy, for example if each chunk has two redundant chunks created, then the four received chunks and their redundant copies can result in creating 12 chunks at the first storage device before creating the convolved chunk that is then also redundantly copied resulting in 15 chunk creation events. Further, the 12 now redundant copies of the four received chunks can then be deleted, e.g., the storage space can be released for reuse, the corresponding storage space can be overwritten and released, etc., leaving just the convolved chunk and related redundant convolved chunk.

In an embodiment of the disclosed subject matter, a first data chunk and a second data chunk corresponding to a first and second zone that are geographically diverse can be stored in a third data chunk stored at third zone that is geographically diverse from the first and second zones, for example see system 100. In an aspect the third chunk, for example chunk 132 of system 100, can represent the data of the first and second data chunks in a compressed form, e.g., the data of the first data chunk and the second data chunk can be convolved, such as by an XOR function, into the third data chunk, for example, chunk 112 can be replicated as chunk 113, chunk 122 can be replicated as chunk 123, and chunks 112 and 123 can be convolved to generate chunk 132, whereby chunk 132 can represent the data of chunks 112 and 122 in a compressed format for example system 100. In an aspect, first data of the first data chunk and second data of the second data chunk can be convolved with or without replicating the entire first data chunk and the entire second data chunk at data store(s) of the third zone, e.g., as at least a portion of the first data chunk and at least a portion of the second data chunk are received at the third zone, they can be convolved to form at least a portion of the third data chunk. Where compression occurs without replicating a chunk at another zone prior to compression, this can be termed as 'on-arrival data compression' and can reduce the count of replicate data made at the third zone and data transfers events can correspondingly also be reduced. As an example, chunk 112 and chunk 122 can be on-arrival convolved into chunk 132, e.g., without forming chunk 113 and chunk 123. In some embodiments, replicates of the third data chunk can be stored in a data store(s) of the third zone. As an example, chunk 132 can be stored in third zone storage component (ZSC) 130, replicated as another chunk is ZSC 130, replicated in another zone, etc. In an aspect, a ZSC can comprise one or more data storage components that can be communicatively coupled, e.g., a ZSC can comprise one data store, two or more communicatively coupled data stores, etc., such that the replication of data in the ZSC can provide data redundancy in the ZSC, for example, providing protection against loss of one or more data stores of the ZSC. As an example, a ZSC can comprise multiple hard drives and data replicates can be stored on more than one hard drive such that, if a hard drive fails, other hard drives of the ZSC can enable access to a data replicate.

Compression of chunks can be performed by different compression technologies. Logical operations can be applied to chunk data to allow compressed data to be recoverable, e.g., by reversing the logical operations to revert to the initial chunk data. One possible compression technique can be an exclusive-or technique. Exclusive or convolution can hereinafter be denoted as 'XOR', '⊕', etc. As an example, data from chunk 1 can undergo an XOR operation with data from chunk 2 to form chunk 3. While other logical and/or mathematical operations can be employed in compression of chunks, those operations are generally beyond the scope of the presently disclosed subject matter and, for clarity and brevity, only the XOR operator will be illustrated herein. However, it is noted that the disclosure is not so limited and that those other operations or combinations of operations can be substituted without departing from the scope of the present disclosure. As such, all logical and/or mathematical operations for compression germane to the disclosed subject matter are to be considered within the scope of the present disclosure even where not explicitly recited for the sake of clarity and brevity.

In an embodiment of the disclosed subject matter, a chunk can be associated with, assigned, etc., a valency. The valency of the chunk can, in some embodiments correspond to, be based on, etc., valencies of data objects comprised in the chunk. In an aspect, valency can represent a permitted level of convolution. It is noted that the 'more convolved' a chunk, generally the more computing resources, e.g., network, processor, memory, etc., resources, can be consumed to access data represented in the convolved chunk. As an example, if a first chunk comprises '00110011' and a second chunk comprises '11010101', then an XOR convolved chunk can comprise '11100110', e.g., 00110011 XOR 11010101=11100110. Where the data of the first chunk is to be accessed via the convolved chunk, assuming the first chunk itself is not accessible, this data cannot simply be read from the convolved chunk. Rather, the convolved chunk can be deconvolved, e.g., based on the second chunk, to recover the first chunk data. Accordingly, where the three chunks are not stored together, the second chunk and convolved chunk can be brought together, e.g., copy the send chunk to co-locate with the convolved chunk, copy the convolved chunk to co-locate with the second chunk, copy the second and convolved chunk to another location, etc. The second chunk can be employed to deconvolve the convolved chunk, e.g., 11100110 XOR 11010101=00110011. This process can involve moving, copying, accessing data, for example between zones via networking resources, which would generally further comprise memory, storage, and processing resources. The process can further comprise deconvolving, which again can be appreciated as typically using further computing resources, to arrive at the desired data.

In an aspect, where the convolved data has been convolved more deeply, additional computing resources can be consumed, e.g., to access data from chunk 'A' from a multiply convolved chunk 'E', where E=ABCD, e.g., $(((A \oplus B) \oplus C) \oplus D)=E$, can comprise deconvolving $ABCD \oplus D=ABC$, then $ABC \oplus C=AB$, then $AB \oplus B=A$. As such, it can be desirable to limit convolution(s) of some data objects, and correspondingly, of chunks comprising said data objects. Valency can indicate a level of permitted convolution. As such, valency can serve to cap a count of convolution(s) which can be associated with reducing an associated amount of computing resources to access data of the associated chunk. In another aspect, valency can be employed to convolve chunks with the same, or sufficiently similar, valencies, e.g., to coordinate convolution. As an example, convolving two chunks that each indicate one permitted convolution, e.g., a valency of one, can result in a convolved chunk that does not permit further convolution. However, convolving a first chunk with a valency of one and a second chunk with a valency of twenty can result in a convolved chunk with a valency of zero, which can truncate further convolution of the second chunk data. As such, grouping same/similar valencies can allow convolution to be more complete, e.g., for four chunks with valencies of 1, 20, 1, 20 correspondingly, creating two convolved chunks with zero valency can be less desirable than creating once chunk with zero valency and one chunk with 19 valency because the 19 valency chunk can be further convolved to more efficiently consume storage space, e.g., first convolved chunk [1+19→0] and second convolved chunk [1+19→0] can be less desirable than first convolved chunk [1+1→0] and second convolved chunk [20+20→19].

In an aspect, there can be reasons to convolve chunks with dissimilar or mismatched valencies. As an example, where storage space is limited, convolving dissimilar, mismatched, etc., valency chunks can indeed conserve storage space, albeit at the expense of less efficient storage space overall. As an example, chunk A can have a valency of 19, which can be depicted hereinafter as 'Chunk A[19]', 'A[19]' etc. Other example chunks B, C, and D can be B[5], C[3], D[1]. Where a zone has limited storage, for example, can only store five chunks, then storing A, B, C, and D, separately can consume ⅘ths of the zone. However, convolving the four chunks into a chunk 'E' can consume only ⅕th of the zone, e.g., A, B, C, and D consume ⅘ths of the zone while ABCD can consume only ⅕th of the zone. While this can relieve the burden on storage, the resulting convolved chunk can have a valency of zero and further convolution can be restricted, e.g., $(((A[19] \oplus B[5]) \oplus C[3]) \oplus D[1])=E[0]$, because D[1] can limit total convolutions of chunk D to one, and it has been convolved once into E. As disclosed herein, convolving dissimilar, mismatched, etc., chunks can limit full convolution of data some participating chunks, but can be desirable in some circumstances. In an aspect, the convolution of mismatched, dissimilar, etc., chunks can be reversible to allow for re-convolution, which, in an aspect, can reduce less desirable convolutions. As an example, where the above example system later receives chunk F[3], chunk E[0] can be deconvolved to three chunks $(A[19] \oplus B[5])$, C[3], and D[1], then re-convolved with chunk F[3] to yield, for example, three chunks: $(A[19] \oplus B[5])$, $C[3] \oplus F[3]$, and D[1], which can be rewritten as AB[4, 19*], CF[2], D[1]. It is noted that the notation AB[4, 19*] can indicate that chunk AB has a valency of 4 based on convolving B[5] which reduces the resulting chunk's valency by one, e.g., 5−1=4, and can further indicate that the resulting convolved chunk was based on mismatched valencies wherein the other valency was 19, e.g., $(A[19] \oplus B[5]) \rightarrow AB[4]$ but the notation AB[4, 19*] further indicates a valency mismatch such that deconvolving can result in two chunks with different valencies of 5 and 19. In an aspect, AB[4, 19*] can also be written as BA[4, 19*] and/or AB[19*, 4] to further indicate specifically that chunk A came in with a valency of 19 and that chunk B came in with a valency of 5 where 4+1=5. In some embodiments, the convolved chunk can comprise information indicating the valencies of participating chunks, changes to the valencies of participating chunks through one or more convolutions, etc. In some embodiments, journal chunks can comprise valency, change of valency, etc., information for chunks undergoing convolution, de-convolution, re-convolution, etc. In some embodiments, a controller can comprise this type of information. As is disclosed herein, it can generally be preferable to convolve based on matching valencies for other reasons in addition to reducing a need to track mismatched valencies that can enable re-convolution aspects disclosed herein. However, where chunks with mismatched valencies can still indeed be convolved, the above disclosed notation(s) can be useful in describing this aspect of the disclosed subject matter more clearly.

In some embodiments, a chunk can comprise data that should not be convolved. This can be denoted by a valency of zero. As an example, A [0] should not be convolved with B [2] based on the valency of A indicating that it should not be convolved. In an embodiment, a zero valence chunk can be replicated without convolution, e.g., mirroring the chunk. In some embodiments, a zero valency chunk can indeed be convolved, although generally it is desirable to deconvolve the result as promptly as possible. As an example, $A[0] \oplus B[2] \rightarrow AB[-1,2*]$, for example where storage space is extremely limited, where both chunks A and B are to be communicated to another zone and it can be more efficient to send AB rather than each of A and B, etc. However, the zero valency of A typically indicates that it should not favorably be convolved, for example based on legal reasoning/requirements, customer indications, etc., and, as such, AB[−1,2*] should be deconvolved to A[0] and B[2] as promptly as is reasonable to return to a compliant condition.

In some embodiments, a chunk can undergo unlimited convolutions, for example where access to the data is less critical, less time sensitive, or infrequent, for example, backup sales lead data that is also present in paper form and is expected to become stale in a few months can be designated as available for unlimited convolutions. Higher valencies, especially unlimited convolutions, e.g., infinite valency denoted for example chunk A as A[INF], etc., can allow for high levels of compression and, in some embodiments can be associated with a lower cost of storage that can, for example, be passed along to a data storage customer, etc. In an aspect, access to this data, especially where the chunk is deeply convolved, can be computing resource intensive, can be slow, e.g., due to the higher count of processes to recover it from a deep convolution, etc. This can be associated with a higher cost of access that can, for example, also be passed to the customer. One example of using infinite valency can be for storage of recurrent backups, for example, a first chunk can comprise a primary backup of a drive performed on a Saturday, which can be demoted to a secondary backup as a new primary backup is created on Sunday, which can become tertiary on Monday, etc., such that at some point, the value of the data in the first chunk is low enough that it is assigned an infinite valency. As such, the first chunk data will continue to be preserved in convolutions of the first chunk, e.g., where other data of the chunk is not stale, noting that when the whole chunk is stale it can be deleted by processes outside the scope of the instant disclosure, though the preservation can be deeply convolved, which can be associated with a low cost of storage. Accordingly, access to first chunk data can be highly involved and can be costly and, where the customer needs it, possible. This example type of storage can be regarded as 'glacial', e.g., low access/low cost/highly convolved. It can be in contrast to zero-valency chunks that can simply be mirrors, replicates, etc., of other chunks, and which typically are not available for convolution to conserve storage space, etc., wherein zero-valency can be regarded as 'hot', e.g., high access/high cost/no (low or transient) convolution.

In an aspect, the presently disclosed subject matter can include 'zones'. A zone can correspond to a geographic location or region. As such, different zones can be associated with different geographic locations or regions. As an example, Zone A can comprise Seattle, Wash., Zone B can comprise Dallas, Tex., and, Zone C can comprise Boston, Mass. In this example, where a local chunk from Zone A is replicated, e.g., compressed or uncompressed, in Zone C, an earthquake in Seattle can be less likely to damage the replicated data in Boston. Moreover, a local chunk from Dallas can be convolved with the local Seattle chunk, which can result in a compressed/convolved chunk, e.g., a partial or complete chunk, which can be stored in Boston. As such, either the local chunk from Seattle or Dallas can be used to de-convolve the partial/complete chunk stored in Boston to recover the full set of both the Seattle and Dallas local data chunks. The convolved Boston chunk can consume less disk space than the sum of the Seattle and Dallas local chunks. An example technique can be XOR, where the data in the Seattle and Dallas local chunks can be convolved by XOR processes to form the Boston chunk, e.g., C=A1⊕B1, where A1 is a replica of the Seattle local chunk, B1 is a replica of the Dallas local chunk, and C is the convolution of A1 and B1. Of further note, the disclosed subject matter can further be employed in more or fewer zones, in zones that are the same or different than other zones, in zones that are more or less geographically diverse, etc. As an example, the disclosed subject matter can be applied to data of a single disk, memory, drive, data storage device, etc., without departing from the scope of the disclosure, e.g., the zones represent different logical areas of the single disk, memory, drive, data storage device, etc. Moreover, it will be noted that convolved chunks can be further convolved with other data, e.g., D=C1⊕E1, etc., where E1 is a replica of, for example, a Miami local chunk, E, C1 is a replica of the Boston partial chunk, C, from the previous example and D is an XOR of C1 and E1 located, for example, in Fargo.

In an aspect, XORs of data chunks in disparate geographic locations can provide for de-convolution of the XOR data chunk to regenerate the input data chunk data. Continuing a previous example, the Fargo chunk, D, can be de-convolved into C1 or E1 based on either C1 or D1; the Miami chunk, C, can be de-convolved into A1 or B1 based on either A1 or B1; etc. Where convolving data into C or D comprises deletion of the replicas that were convolved, e.g., A1 and B1, or C1 and E1, respectively, to avoid storing both the input replicas and the convolved chunk, de-convolution can rely on retransmitting a replica chunk that so that it can be employed in de-convoluting the convolved chunk. As an example the Seattle chunk and Dallas chunk can be replicated in the Boston zone, e.g., as A1 and B1. The replicas, A1 and B1 can then be convolved into C. Replicas A1 and B1 can then be deleted because their information is redundantly embodied in C, albeit convolved, e.g., via an XOR process, etc. This leaves only chunk C at Boston as the backup to Seattle and Dallas. If either Seattle or Dallas is to be recovered, the corollary input data chunk can be used to de-convolve C. As an example, where the Seattle chunk, A, is corrupted, the data can be recovered from C by de-convolving C with a replica of the Dallas chunk B. As such, B can be replicated by copying B from Dallas to Boston as B1, then de-convolving C with B1 to recover A1, which can then be copied back to Seattle to replace corrupted chunk A.

In some circumstances, disk space management can seek to recover underutilized disk space. As an example, where the Seattle chunk, A, is to be deleted, recovery of the Dallas chunk, B, via Boston convolved chunk, C, becomes dependent on having a copy of B to de-convolve C with after A has been deleted. As such, it can be desirable to deconvolve C into A1 and B1 prior to deleting A and A1, such that B1 can be convolved with another chunk, for example Miami chunk, E. As such, recovery of B1 can be based on E1 and the XOR of B1E1. Also of note, to de-convolve C in to A1 and B1, a replica of A, e.g., A1 is made in Boston, this allows recovery of B1. Once B1 is recovered, C, A1, and A can be deleted. Then B1 can be convolved with E1. It will be noted that data is transferred, e.g., A is copied into A1 from Seattle to Boston, to allow C to be de-convolved.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate data convolution for geographically diverse storage, in accordance with aspects of the subject disclosure. System 100 can comprise three or more zone storage components (ZSCs), e.g., first ZSC 110, second ZSC 120, third ZSC 130, etc. The ZSCs can communicate with the other ZSCs of system 100. A zone can correspond to a geographic location or region. As such, different zones can be associated with different geographic locations or regions. A ZSC can comprise one or more data stores in one or more locations. In an aspect, a ZSC can store at least part of a data chunk on at least part of one data storage device, e.g., hard drive, flash memory, optical disk, cloud storage, etc. Moreover, a ZSC can store at least part of one or more data chunks on one or more data storage devices, e.g., on one or more hard disks, across one or more hard disks, etc. As an example, a ZSC can comprise one or more data storage devices in one or more data storage centers corresponding to a zone, such as a first hard drive in a first location proximate to Miami, a second hard drive also proximate to Miami, a third hard drive proximate to Orlando, etc., where the related portions of the first, second, and third hard drives correspond to, for example, a 'Miami zone'.

In an aspect, data chunks can be replicated in their source zone, in a geographically diverse zone, in their source zone and one or more geographically diverse zones, etc. As an example, a Seattle zone can comprise a first chunk that can be replicated in the Seattle zone to provide data redundancy in the Seattle zone, e.g., the first chunk can have one or more replicated chunks in the Seattle zone, such as on different storage devices corresponding to the Seattle zone, thereby providing data redundancy that can protect the data of the first chunk, for example, where a storage device storing the first chunk or a replicate thereof becomes compromised, the other replicates (or the first chunk itself) can remain uncompromised. As an example, chunk 212 in FIG. 2 can be replicated in first ZSC 210 as chunks 214, 216, etc. In an aspect, data replication in a zone can be on one or more storage devices, e.g., chunk 212 can be stored on a first data storage device, chunk 214 can be stored on a second storage device, and chunk 216 can be stored on a third storage device, wherein the first, second, and third storage devices correspond to the first zone, and wherein the first, second, and third storage devices can be the same storage device or different storage devices. Replication of chunks, e.g., chunk 212 into chunks 214, 216, etc., can comprise communicating data, e.g., over a network, bus, etc., to other data storage locations on the first, second, and third storage devices and, moreover, can consume data storage resources, e.g., drive space, etc., upon replication. As such, the number of replicates can be based on balancing resource costs, e.g., network traffic, processing time, cost of storage space, etc., against a level of data redundancy, e.g., how much redundancy is needed to provide a level of confidence that the data/replicated data will be available within a zone.

A geographically diverse storage system, e.g., a system comprising system 100, can create a replicate of a first chunk, e.g., chunk 112, at a geographically diverse ZSC, for example, chunk 113 at third ZSC 130, etc. The replicate at the geographically diverse ZSC can provide data redundancy at a different level than the level associated with data replicates within a single ZSC. As an example, where first ZSC 110 is affiliated with a Seattle zone, and third ZSC 130 is affiliated with a Boston zone, then a regional event that compromises chunk 112 in the Seattle zone can be less likely to also compromise chunk 113 in the Boston zone.

In an aspect, replication of chunks between different zones of system 100 can consume data storage resources, e.g., network traffic, data storage space, processor time, energy, manpower, etc. As an example, replication of chunk 112 and chunk 122 at third ZSC 130, e.g., as chunk 113 and chunk 123 respectively, can consume processing cycles at each of the first to third ZSCs 110, 120, and 130, can consume network resources to communicate the data between the first to third ZSCs 110, 120, and 130, can consume data storage space/resources at each of the first to third ZSCs 110, 120, and 130, etc. Moreover, where, as illustrated, a ZSC, e.g., ZSC 130, stores replicates of chunks from other zones, e.g., ZSCs 110 and 120, the replicated chunks, e.g., chunk 113 and chunk 123, can occupy a first amount of storage space, e.g., chunks 113 and 123 consume a first amount of storage space on storage device(s) of third ZSC 130. Compression of the redundant data can reduce the amount of consumed storage space while preserving the redundancy of the data. As an example, chunk 113 and chunk 123 can be compressed into chunk 132 that can consume less data storage space than the space associated with separately storing each of chunk 113 and chunk 123. In an embodiment, compression can be via an XOR operation of chunk 113 and chunk 123, e.g., 'chunk 132=chunk 113 XOR chunk 123,' etc. Thereafter, in some embodiments, chunks 113 and 123 can be deleted, e.g., the space used by chunks 113 and 123 can be freed, released, reclaimed, etc., for other uses.

Figure 2:
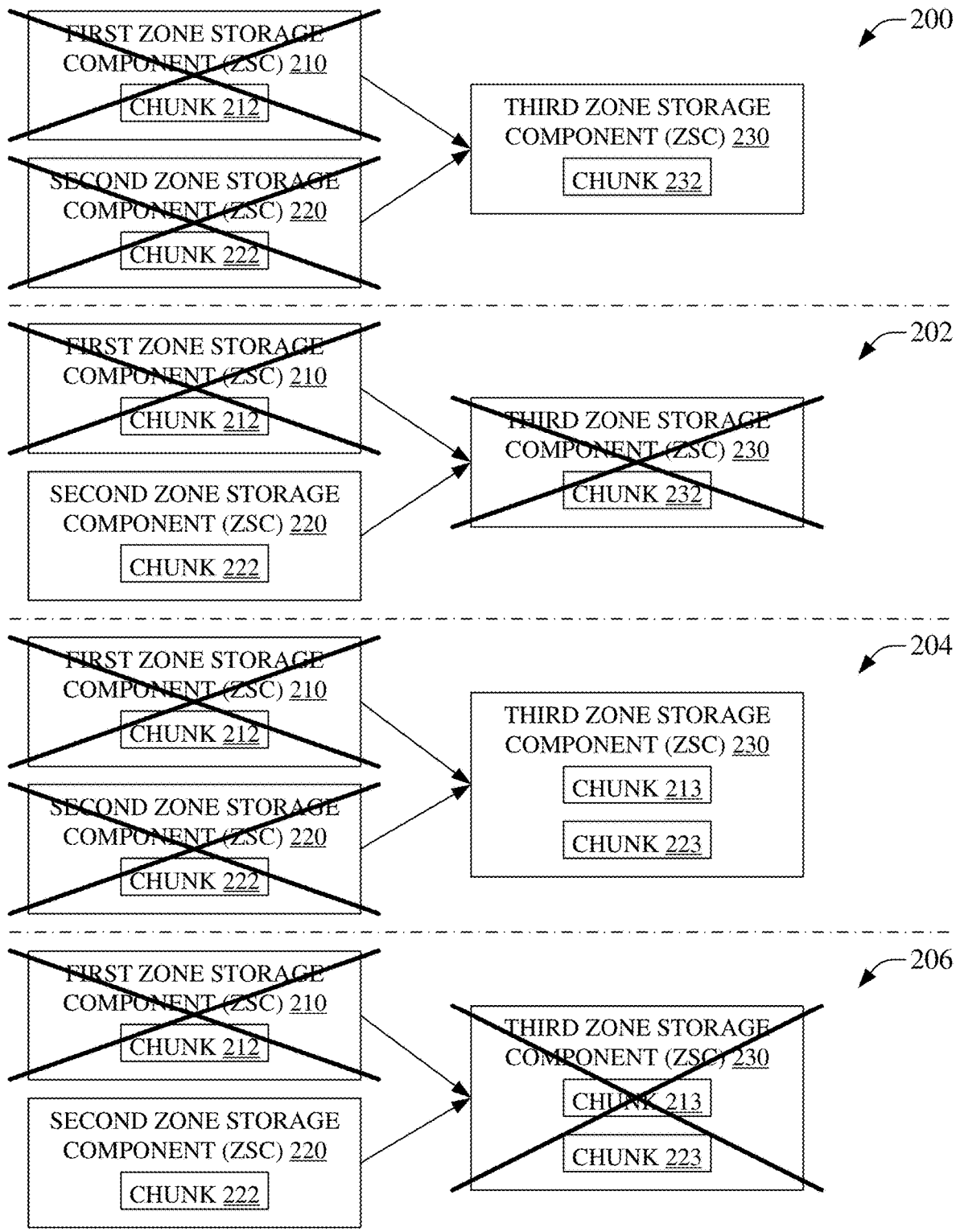
FIG. 2 is an illustration of an example data loss event(s) for a system(s) that can facilitate data convolution for geographically diverse storage, in accordance with aspects of the subject disclosure.

FIG. 2 is an illustration of an example data loss event(s) for a system(s) 200-206, that can facilitate data convolution for geographically diverse storage, in accordance with aspects of the subject disclosure. System 200 can comprise three ZSCs, e.g., first ZSC 210, second ZSC 220, third ZSC 230, etc., which can be comprise in a geographically diverse storage system. Chunks 212 and 222 can be replicated and compressed as chunk 232, e.g., chunk 232 can comprise information enabling recovery of chunks 212 or 222 via deconvolution. In an aspect, if any one ZSC becomes less accessible, the data of chunks 212 and/or 222 can remain accessible. As an example, if ZSC 230 becomes less accessible, chunks 212 and 222 can remain accessible via ZSC 210 and 220 respectively. As another example, if ZSC 210 becomes less accessible data of chunk 212 can be recovered via deconvolving chunk 232 with chunk 222. These examples can illustrate protection of data against loss of any one zone. However, where two ZSCs become less accessible, the data of chunks 212 and 222 can become compromised. As an example, where first ZSC 210 and second ZSC 220 become less accessible, chunk 232 cannot be employed to recover either chunk 212 or chunk 222. Similarly, for system 202, where ZSCs 210 and 230 can become less accessible, chunk 212 can be compromised, e.g., chunk 232 can be unavailable to participate in recovery of chunk 212 even though chunk 222 can be available. As such, data in chunk 212 can be compromised where there is a loss of more zones than the system is designed to be resilient against.

At system 204, rather than using compression as in systems 200 and 202, mirroring of data can be employed to protect chunks. As such, from the perspective of chunk 212, which can become less available in systems 200 and 202, the data of chunk 212 can remain accessible, due to the use of mirroring, in some circumstances where more than one ZSC becomes less available. As an example, in system 204, where both ZSC 210 and 222 become less available, same/similar to system 200, chunk 213, which can be a mirror of chunk 212, can remain accessible, in contrast to chunk 232 comprising the data but not being able to be deconvolved in system 200. Similarly, in system 204, data of chunk 222 replicated in chunk 223 can remain accessible. Moreover, where ZSC 220 and 230 become less accessible, chunk 212 can remain available at ZSC 210, not illustrated. However, at system 206, loss of ZSCs 210 and 230 can compromise data of chunk 212, e.g., because both chunk 212 and the replicate chunk 213 can be less accessible, although chunk 222 can remain accessible.

As such, data that is mirrored can generally consume more storage space, from the system perspective, than convolved data. However, typically, mirrored data can be more accessible where more zones become less accessible than the system was designed to protect against. As such, where data is designated as needing higher availability, a zero data valency can be selected to cause mirroring rather than convolution and can therefore provide higher accessibility to the zero valency data at the cost of consuming more storage space, etc.

Figure 3:
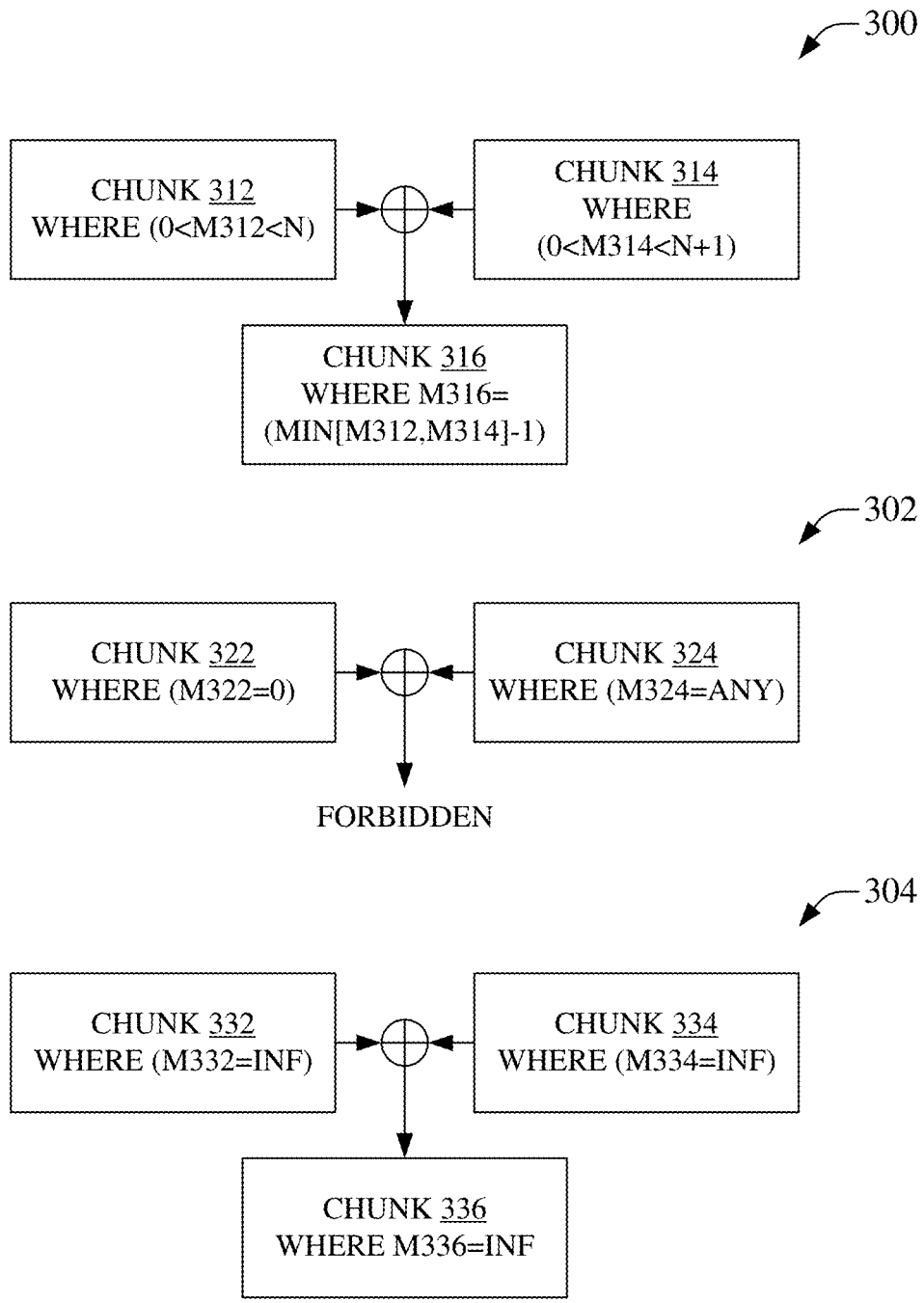
FIG. 3 is an illustration of an example system that can enable valency-based data convolution for geographically diverse storage, in accordance with aspects of the subject disclosure.

FIG. 3 is an illustration of a system 300, which can facilitate valency-based data convolution for geographically diverse storage, in accordance with aspects of the subject disclosure. System 300 can correspond to management of non-zero valency data, e.g., chunks determined to have a valency of more than zero. System 300 can facilitate valency based convolution of chunk 312, e.g., convolution based on the valency of chunk 312, e.g., M312, and chunk 314, e.g., M314. In example system 300 both chunks 312 and 314 can be determined to have non-zero valency, e.g., M312>0 and M314>0. In an aspect, chunk 312 can have a valency less than N, where N represents the number of zones, e.g., ZSCs, in a geographically diverse data storage system. In an aspect, chunk 314 can have a valency less than N+1. It is noted that a valency of N+1 can be treated as an infinite valency until decrementing of the valency via convolution reduces the resulting valency to less than N, e.g., where the valency of a chunk is N or greater, it can continue to be convolved indefinitely. In some examples of system 300, the valency of chunk 314, M314, can be infinite, e.g., N+1 can be substituted with an infinite value, without departing from the illustrated convolution. Where chunks 312 and 314 have non-zero valency, they can be convolved, e.g., XORed as illustrated, into chunk 316. Chunk 316 can have a valency, e.g., M316, which can be one less than the lesser of the valencies of the participating chunks, e.g., the valency of chunk 316, M316, can be equal to one less than the lesser of M312 and M314. Decrementing the valency of the convolved chunk indicates that the convolved chunk comprises at least one chunk that had a valency of one increment greater. As an example, where M312=2 and M314=2, then M316, e.g., the valency of the convolved chunk, can be one, which can indicate that chunk 316 can be convolved one more time, which would be associated with convolving chunks 312 and 314 twice, e.g., once with each other and once with another non-illustrated chunk. As another example, where M312=2 and M314=5, then M316, e.g., the valency of the convolved chunk, can be one, which can indicate that chunk 316 can be convolved one more time, even though chunk 314 would allow up to five levels of convolution, because convolution is limited by the lower valency of chunk 312 that allows up to two levels of convolution. As a further example, where M312=5 and M314=2, then M316, e.g., the valency of the convolved chunk, can be one, which can indicate that chunk 316 can be convolved one more time, even though chunk 312 would allow up to five levels of convolution, because convolution is limited by the lower valency of chunk 314 that allows up to two levels of convolution. Embodiments that convolve infinite valency chunks are addressed at system 304 herein below.

At system 302, chunk 322 can have a zero valency, e.g., M322=0. As is disclosed elsewhere herein, a zero valency can indicate that the chunk is not to be convolved. As an example, at the time of this disclosure, Securities and Exchange Commission (SEC) rule 17a-4f can de facto prohibit convolution of trading history data and, accordingly, chunks comprising trading history data can be designated as having a zero valency, e.g., where some/all data of the chunk has a zero valency, the corresponding chunk can also have zero valency. As an example, a chunk comprising all trading history data can have a zero valency. As another example, a chunk comprising non-zero valency data objects and one trading history data object, which can have a zero valency, can be designated as having a zero valency. As such, even where other non-zero valency chunks are available for convolution, the convolution with a zero valency chunk can be forbidden, as illustrated. Accordingly, the valency of chunk 324 is generally irrelevant, e.g., M324=ANY value, due to the convolution with a zero valency chunk, e.g., M322=0, being forbidden. It is, however, noted that in some atypical circumstances, a zero valency chunk can be convolved, as is discussed elsewhere herein, e.g., transient convolution of a zero valency chunk, such as for network transport, highly limited storage conditions, etc. However, this typically, zero valency chunks are not to be considered available for convolution.

At system 304, convolution of infinite valency chunks is illustrated. As is disclosed elsewhere herein, infinite valency can indicate that a chunk can undergo any number of levels of convolution. As an example, in glacial data storage, data access can be of a lower priority than storage efficiency and, accordingly, repeated convolution of this type of data can provide high levels of storage efficiency through many levels of convolution. However, high levels of convolution can be associated with increased complexity of recovery, e.g., consuming more computing resources to access highly convolved chunks. As is illustrated, decrementing of an infinite valency merely results in an infinite valency, e.g., MIN(M322, M334)−1=M336=INFINITY. As such, convolving chunk 332 and chunk 334 into chunk 336 can result in chunk 336 having an infinite valency, e.g., M336=INF, even though M336 can be asserted as technically being the lesser of M322 and M334, which are both infinite, being decremented, e.g., infinity−1=infinity.

Figure 4:
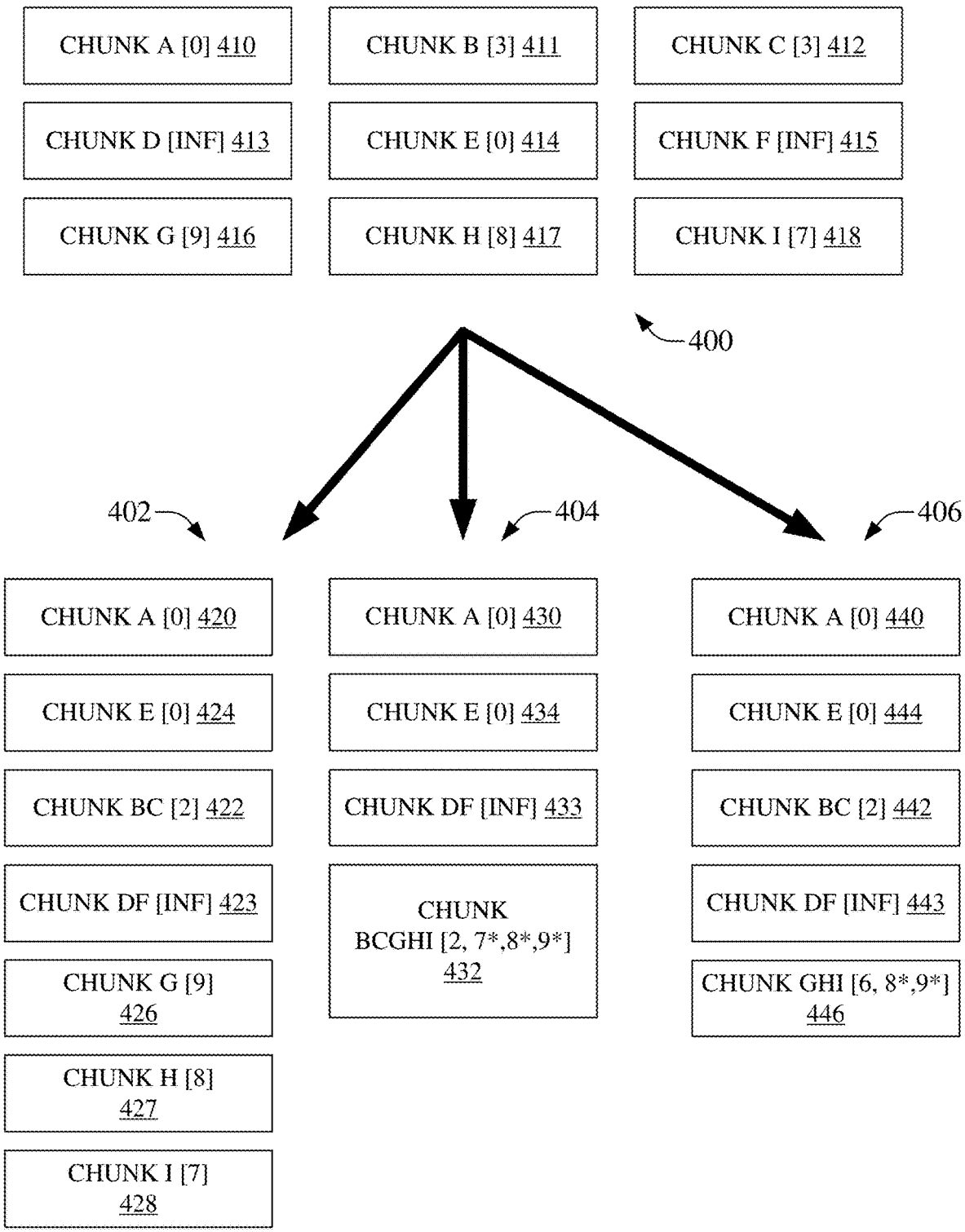
FIG. 4 illustrates an example system(s) that can facilitate data convolution(s) for geographically diverse storage based on data valency, in accordance with aspects of the subject disclosure.

FIG. 4 is an illustration of a system 400, which can enable data convolution(s) for geographically diverse storage based on data valency, in accordance with aspects of the subject disclosure. System 400 can illustrate some chunks stored in a geographically diverse data storage system, e.g., a geographically diverse data storage system can comprise chunks 410-418. Determined valencies of the several chunks are indicated in system 400, e.g., chunk A [0] 410 has a zero valency, chunk B [3] 411 has a valency of three, chunk D [INF] 410 has an infinite valency, chunk G [9] 410 has a valency of nine, etc. Accordingly, system 400 can be instructed to convolve chunks to conserve storage space. Convolution of chunks of system 400 can result in different levels of storage space preservation, e.g., one or more convolution rules can result in orchestrating convolution to achieve different levels of data compaction. As an example, a first convolution rule can result in convolution of only matched valency chunks, e.g., system 402, etc. As another example, a second convolution rule can result in more aggressive convolution that can convolve some mismatched valency chunks, e.g., system 406, etc. As a further example, a third convolution rule can result in highly aggressive convolution that can convolve more mismatched valency chunks, e.g., system 404, etc.

System 402 can result from convolving non-zero matching valency chunks of system 400. Accordingly, in an aspect, all infinite valency chunks, e.g., chunk D [INF] 413, chunk F [INF] 415, etc., can be convolved into one chunk, e.g., chunk DF [INF] 423. In another aspect, all non-zero non-infinite valency chunks that have a matching valency can be convolved in to corresponding chunks, e.g., chunk B [3] 411 and chunk C [3] 412 can have matching non-zero non-infinite valencies of three and can be convolved into chunk BC [2] 422 that can have a valency that is a decrement of the lessor of the valencies of the contributing chunks, e.g., MIN(3, 3)−1=3−1=2. In a further aspect, chunks that do not have non-zero non-infinite valencies matching a valency of another chunk can remain convolved, e.g., in system 400, chunk G [9] 416, chunk H [8] 417, chunk I [7] 418, etc., can each have a non-zero non-infinite valency that also does not match a valency of another chunk and, as such, each can remain convolved, as is illustrated in system 402 as chunk G [9] 426, chunk H [8] 427, chunk I [7] 428, etc. In a still further aspect, zero valency chunks of system 400, e.g., chunk A [0] 410, chunk E [0] 414, etc., can remain unconvolved, illustrated in system 402 as chunk A [0] 420, chunk D [0] 424, etc., for reasons discussed elsewhere herein, e.g., a zero valency chunk is typically inherently not available for convolution with another chunk.

System 404 can result from another embodiment of convolving non-zero matching valency chunks of system 400, e.g., convolving according to a different rule than demonstrated for system 402. Again, in an aspect, all infinite valency chunks, e.g., chunk D [INF] 413, chunk F [INF] 415, etc., can be convolved into one chunk, e.g., chunk DF [INF] 433. Also similar to system 402, zero valency chunks of system 400, e.g., chunk A [0] 410, chunk E [0] 414, etc., can remain unconvolved, illustrated in system 404 as chunk A [0] 430, chunk D [0] 434, etc., where a zero valency chunk is generally not available for convolution with another chunk.

However, unlike in system 402, use of an aggressive convolving strategy in system 404, can cause convolving of non-zero non-infinite valency chunks that have mismatched valencies, e.g., chunk B [3] 411, chunk C [3] 412, chunk G [9] 416, chunk H [8] 417, chunk I [7] 418, etc., can have mismatched non-zero non-infinite valencies and can be convolved into chunk BCGHI [2, 7*, 8*, 9*] 432. Chunk BCGHI [2, 7*, 8*, 9*] 432 can have a valency that is a decrement of the lessor of the valencies of the contributing chunks, e.g., MIN(3, 3, 7, 8, 9)–1=3–1=2. Additionally, other contributing chunk valencies can be indicated, e.g., 7*, *8, 9*, etc., that can indicate that the convolved chunk comprises mismatched valency chunks and further can indicate the contributing valencies. The indicated contributing mismatched valencies can facilitate reconvolving of the contributing chunks. In an embodiment, reconvolving BCGHI [2, 7*, 8*, 9*] 432, for example, can comprise deconvolving BCGHI [2, 7*, 8*, 9*] 432, for example into chunk B [3], C [3], and GHI [6, 8*, 9*] and can comprise convolving B and C into BC [2], resulting in BC [2] and GHI [6, 8*, 9*]. Other possible reconvolved results can readily be appreciated and are to be expressly considered within the scope of the instant disclosure even where not recited for the sake of clarity and brevity.

The more aggressive convolving of chunks from system 400 in to system 404, in contrast to system 402, can illustrate storing of only four chunks in system 404 in contrast to storing seven chunks in system 402 and in further contrast to storing nine chunks in system 400. However, it can be appreciated that access to data of chunk B or C in system 404 can consume greater computing resources than can in system 402. In an example, where the lower valency of chunks B and C in system 400, e.g., chunks 411 and 412, relative to the higher valencies of chunks G, H, and I, in system 400, can suggest that the data of chunks 411 and 412 can be accessed more frequently, should be associated with a lower cost of access in terms of money and/or computing resources, etc., than for chunks G, H, and I, in system 400. As such, in this example, it can be regarded as highly aggressive convolution because of the divergence of valencies in a resulting convolved chunk, e.g., chunk BCGHI [2, 7*, 8*, 9*] 432 convolves chunks with valencies as low as three and as high as nine for a divergence of six, in contrast to chunk BC [2] 422 that convolves chunks with valencies of three and has a zero divergence, or in contrast to chunk GHI [6, 8*, 9*] 446 that convolves chunks with valencies as low as seven and as high as nine for a divergence of two. Accordingly, the illustrated highly aggressive convolving can result in higher levels of storage space preservation than less aggressive convolving, e.g., system 402 and system 406, but can be associated with a greater divergence and a greater demand on computing resources to access data of participating chunks.

System 406 can result from a further embodiment of convolving non-zero matching valency chunks of system 400, e.g., convolving according to another rule different than that demonstrated for system 402 or 404. As before, all infinite valency chunks, e.g., chunk D [INF] 413, chunk F [INF] 415, etc., can be convolved into one chunk, e.g., chunk DF [INF] 443. Also similar to systems 402 and 404, zero valency chunks of system 400, e.g., chunk A [0] 410, chunk E [0] 414, etc., can remain unconvolved, illustrated in system 406 as chunk A [0] 440, chunk D [0] 444, etc., where a zero valency chunk is generally not available for convolution with another chunk.

However, unlike in systems 402 and 404, use of a moderately aggressive convolving strategy in system 406, can cause more limited convolving of non-zero non-infinite valency chunks that have mismatched valencies, e.g., chunk G [9] 416, chunk H [8] 417, chunk I [7] 418, etc., can have mismatched non-zero non-infinite valencies and can be convolved into chunk GHI [6, 8*, 9*] 446. Additionally, more like the strategy of system 402, matching non-zero non-infinite valency chunks can be convolved, e.g., chunk B [3] 411, chunk C [3] 412, can be convolved into chunk BC [2] 442. Chunk GHI [6, 8*, 9*] 446 can have a valency that is a decrement of the lessor of the valencies of the contributing chunks, e.g., MIN(7, 8, 9)–1=7–1=6. Additionally, other contributing chunk valencies can be indicated, e.g., *8, 9*, etc., that can indicate that the convolved chunk comprises mismatched valency chunks and further can indicate the contributing valencies, similar to that shown in system 404. The indicated contributing mismatched valencies can facilitate reconvolving of the contributing chunks.

The example moderately aggressive convolving of chunks from system 400 in to system 406, in contrast to system 402 or system 404, can illustrate storing of five chunks in system 406, rather than only four chunks in system 404, seven chunks in system 402, and nine chunks in system 400. As such, the moderately aggressive convolving of system 406 can be less space saving as a more aggressive convolving scheme, however, it can be appreciated that access to data of chunk B or C in system 406, e.g., via chunk BC [2] 442, can consume fewer computing resources than in chunk BCGHI [2, 7*, 8*, 9*] 432 of system 404, and being more similar to chunk BC [2] 422 of system 402. As in system 404, the divergence of valencies in a resulting convolved chunk can be broader than in system 402, e.g., chunk GHI [6, 8*, 9*] 446 convolves chunks with valencies as low as seven and as high as nine for a divergence of two, in contrast to chunk BC [2] 422 that convolves chunks with valencies of three and has a zero divergence, however, the divergence can be less than illustrated in system 404. Accordingly, the illustrated moderately aggressive convolving can result in higher levels of storage space preservation than less aggressive convolving, e.g., system 402, etc., while still facilitating comparatively less computing resource demand to access convolved data than a more aggressive convolving, e.g., system 404, which can be reflected in the lower divergences of valencies in resulting convolved chunks.

FIG. 5 is an illustration of an example system state(s) T=1 to T=10 for an example system facilitating data convolution for geographically diverse storage based on data valency, in accordance with aspects of the subject disclosure. Example system state T=1 illustrates a geographically diverse data storage system storing data comprising chunk A [0] 510.

Chunk A [0] 510 can have a valency of zero, as is denoted by the bracketed valency value. At T=2, the system can additionally store chunk B [3] 511 having a valency of three. Where chunk A has a valency of zero, it can generally indicate that the chunk is not to be convolved with another chunk, as such, chunk A will typically not be convolved with chunk B, even though chunk B has a valency of three.

At T=3, chunk C [3] 512 can be added to the geographically diverse data storage system. Chunk C can have a valency of three. Accordingly, at T=4, chunk B and chunk C can be convolved where they have non-zero valency. Moreover, the valencies of chunk B and chunk C are matched, e.g., both chunk B and chunk C have the same valency value of three. Therefore, at T=4, the geographically diverse data storage system can comprise Chunk A and chunk BC [2] 542. Chunk BC can be a convolution of chunks B and C from T=3. Moreover, chunk BC can have a valency of two based on the lesser of the valencies of chunks B and C being decremented, e.g., MIN(3, 3)−1=2.

The geographically diverse data storage system, at T=5, can have chunk D [INF] 513 added, which can have an infinite valency value. Accordingly, chunk D can be convolved repeatedly without limit, e.g., infinite levels of convolving with other chunks. However, convolving a chunk with an infinite valency with a chunk with a finite valency can result in a convolved chunk with a finite valency. As such, at T=6, chunk D can remain unconvolved.

Independently, at T=6, chunk E [0] 514 can be added to the geographically diverse data storage system. Whereas chunk E, similar to chunk A, has a zero valency value, convolving chunk E with another chunk can be restricted, forbidden, etc. As such, at T=7, chunk E can remain unconvolved with another chunk. Additionally, chunk F [INF] 515 can be added to the storage system.

At T=8, where both chunk D and chunk F have an infinite valence value, these two chunks can be convolved into chunk DF [INF] 543. Chunk DF can have an infinite valency based on both participating chunks having an infinite valency and infinity−1=infinity such that MIN(INF, INF)−1=INF−1=INF.

At T=9, three chunks can be added to the storage system, e.g., chunk G [9] 516, chunk H [8] 517, and chunk I [7] 518. Correspondingly, chunk G can have valency of 9, chunk H can have a valency of 8, and chunk I can have a valency of 7. In some embodiments, even though these are non-zero valencies, the three chunks can remain unconvolved where they are mismatched, e.g., no other illustrated example chunk has a valency of 7, 8, or 9. However, in the illustrated embodiment, at T=10, chunks G, H, and I, can be convolved to consume less storage space of the geographically diverse data storage system. A resulting chunk GHI can have a valency of the lowest valency of the contributing chunks decremented, e.g., MIN(7, 8, 9)−1, such that chunk GHI can have a valency of six. Moreover, the valency of chunk GHI can further indicate the incoming valencies of other mismatched chunks. This can result in chunk GHI [6, 8*, 9*] 546, as is illustrated. In an embodiment, the illustrated system states, e.g., T=1 to T=10 can be represent a progression of system 400 to system 406, however, it is noted that system 400 illustrates all of chunks A-I simultaneous to illustrate other aspects of the disclosed subject matter, while FIG. 5, illustrates adding chunks A through I over time and convolving them according to one or more convolving rules also over time.

FIG. 6 is an illustration of example system states, T=1 to T=6, for an example system facilitating data re-convolution for geographically diverse storage based on data valency, in accordance with aspects of the subject disclosure. Example system state T=1 illustrates a geographically diverse data storage system storing chunk A [0] 610, chunk BC [2] 642, chunk DF [INF] 643, chunk E [0] 614, chunk GHI [6, 8*, 9*] 646, etc. In an aspect, this can be the same or similar to state T=10 from FIG. 5.

At T=2, chunk J [7] 650 can be added to the geographically diverse data storage system of FIG. 6. Chunk J can have a valency of 7. In an aspect, chunk GHI [6, 8*, 9*] 646 can limit the convolution of some of the participating chunks, e.g., where chunk GHI [6, 8*, 9*] 646 can be a convolution of chunk G [7], chunk H [8] and chunk I [9], chunk H could have participated in eight levels of convolution, and chunk I could have participated in nine levels of convolution, but chunk GHI [6, 8*, 9*] 646 is limited to only six more levels of convolution based on already having convolved chunk G that was limited to seven levels of convolution. As such, it can be desirable to reconvolve the chunks of T=2 at T=3.

At T=3, reconvolving some chunks can begin by deconvolving some convolved chunks, for example, deconvolving chunk GHI [6, 8*, 9*] 646 from T=2. Deconvolving chunk GHI [6, 8*, 9*] 646 can lead to the chunks illustrated at T=3, e.g., now comprising chunk G [9] 651, chunk H [8] 652, and chunk I [7] 653. Non-zero matched valency chunks, in an aspect, can be convolved based, at least in part, on the example deconvolved chunk GHI [6, 8*, 9*] 646.

Accordingly, reconvolving can proceed, at T=4, to convolve chunk I and chunk J that each have a valency of seven. The resulting chunk IJ [6] 654 can have a valency of MIN[7,7]−1=6 based on the valency of seven for each of chunk I and chunk J before convolution. In an embodiment, chunks G and H can also be reconvolved, albeit again with a mismatched valency where chunk G has a valency of 9 and chunk H has a valency of 8. However, as is illustrated, the chunks can also remain deconvolved.

At T=5, chunk K [8] 660 can be added. As such, the geographically diverse data storage system now comprises two matched valency non-zero chunks that can be convolved, e.g., chunks H and K. Accordingly, at T=6, chunks H and K can be convolved to yield chunk HK [7] 661 having a valency of seven based on MIN[8,8]−1=7 from the participating chunks H and K that each have valencies of eight. As such, reconvolving chunks can be performed. In an aspect reconvolving can comprise deconvolving some chunks, for example, chunks having mismatched participating chunk valencies. In an aspect, reconvolving can consume computing resources, however, the resulting match valency chunks from reconvolving can be desirable as it can reduce the effect of liming the levels of convolution present in mismatched valency chunks. As an example, chunk H can undergo eight levels of convolution, however by convolving chunk H with chunk I that is limited to seven levels of convolution, chunk GHI is then constrained by the valency of chunk I. By reconvolving, chunk HK is no longer constrained by the valency of chunk I, which can allow chunk H, via participation in chunk HK, to eventually undergo all eight levels of convolution. Similar observations can be made regarding chunk G where another matched valency chunk is stored in the geographically diverse data storage system of FIG. 6.

Figure 7:
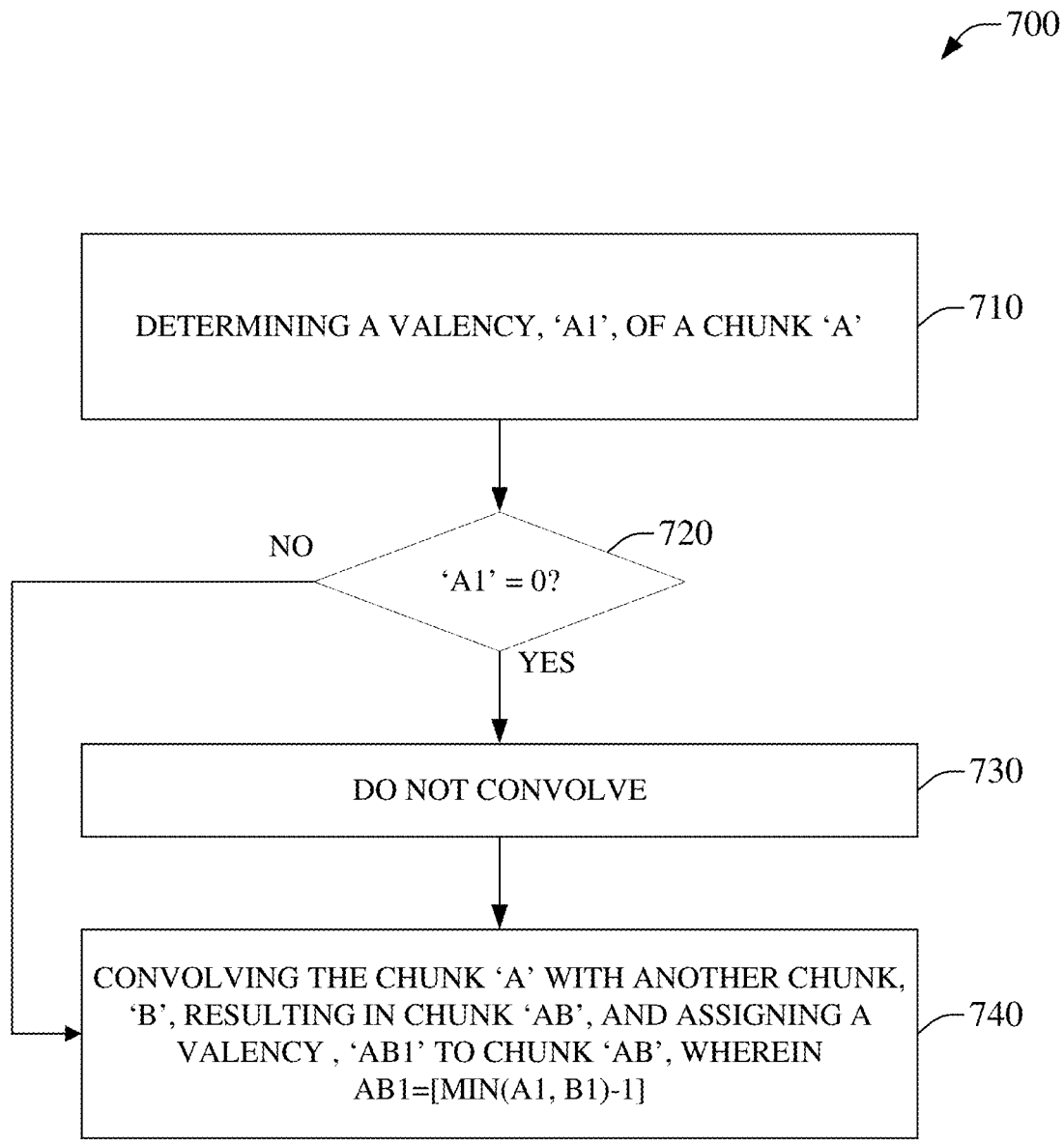
FIG. 7 is an illustration of an example method facilitating data valency-based data convolution for geographically diverse storage, in accordance with aspects of the subject disclosure.
Figure 8:
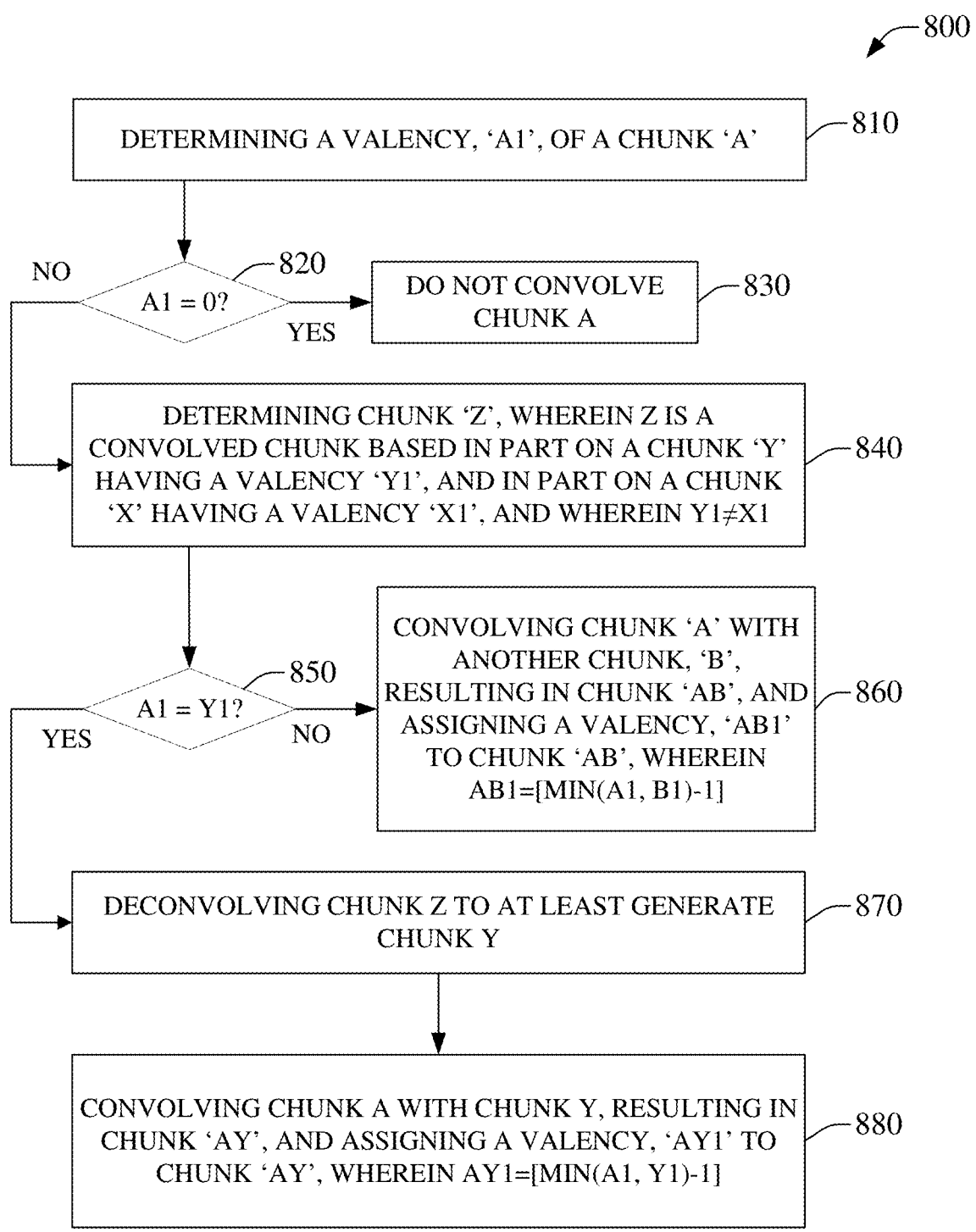
FIG. 8 illustrates an example method that enables data re-convolution for geographically diverse storage based on data valency, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts;

however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate data valency-based data convolution for geographically diverse storage, in accordance with aspects of the subject disclosure. At 710, method 700 can comprise determining a valency, 'A1', for a chunk 'A', e.g., designated as chunk A [A1] in other portions of the present disclosure. In an aspect, a valency can be assigned to a chunk, inherited by a chunk based on valency of data objects comprised in the chunk, determined by a characteristic of a chunk or data comprising the chunk, for example, a client identifier can be associated with a valency such that any data object/chunk corresponding to the client identifier can be assigned or correlated to the corresponding client identifier valency, etc. As an example, client 'MyCo' can be associated with a valency of two, such as where a contract with the client designates that their data will have a valency of two, so that data objects from MyCo have a valency of two that can be inherited by a chunk comprising MyCo data objects, e.g., where all other data objects of the chunk have the same valency, where other data objects of the chunk have 'higher' data valencies so that the MyCo valency is the floor valency, etc. In an embodiment, data objects, chunks, etc., can comprise an identifier that can enable determining valency of a chunk.

At 720, method 700 can comprise determining if valency A1 is equal to zero, e.g., is valency A1 indicating that it should not generally be convolved with other chunks. Where A1 indicates that chunk A is a zero valency chunks, method 700 can advance to 730 where chunk A is not convolved with another chunk. In some embodiments, at 730, method 700 can facilitate 'transient convolution' of chunk A with another chunk as disclosed elsewhere herein, though not illustrated at FIG. 7 for clarity and brevity. Where, at 720, valency A1 is not zero, method 700 can advance to 740.

Method 700, at 740, can comprise convolving chunk A with another chunk 'B' having a valence 'B'. The chunk AB, e.g., resulting from the convolution of chunk A and chunk B, can have a valency of 'AB1'. AB1 can be determined from MIN[A1, B1]−1. The determined value of valency AB1 can be assigned to AB1 of chunk AB.

Valency A1 can be employed to convolve chunk A with a chunk B that can have the same, or sufficiently similar, valency B1. In an aspect this can enable coordinated convolution, e.g., convolved chunks can have same/similar valencies to enable them to undergo a same/similar number of levels of convolution over the life of the chunk. As an example, convolving two chunks that each indicate one permitted convolution, e.g., a valency of one, can result in a convolved chunk that does not permit further convolution, which can be acceptable where both participating chunks indicated that they should only be allowed to have one level of convolution. However, convolving a first chunk with a valency of one and a second chunk with a valency of INF can also result in a convolved chunk with a valency of zero, which can significantly truncate further convolution of the second chunk data, e.g., only allowing one level of convolution rather than infinite levels of convolution. As such, grouping same/similar valencies can allow convolution to be more 'complete'. While there can be reasons to convolve chunks with dissimilar or mismatched valencies, for example, where storage space is limited, convolving dissimilar, mismatched, etc., valency chunks can indeed conserve storage space, albeit at the expense of less efficient storage space overall, it can often be desirable to convolve chunks with matched or similar valencies.

FIG. 8 is an illustration of an example method 800, which can enable data re-convolution for geographically diverse storage based on data valency, in accordance with aspects of the subject disclosure. At 810, method 800 can comprise determining a valency, 'A1', for a chunk 'A'. Accordingly, at 820, method 800 can facilitate determining if valency A1 is equal to zero. Where A1 indicates that chunk A is a zero valency chunk, method 800 can advance to 830 where chunk A is not convolved with another chunk, or in some non-illustrated embodiments, method 800, at 830, can facilitate 'transient convolution' of chunk A with another chunk as disclosed elsewhere herein. At this point, method 800 can end. However, at 820, where valency A1 is not zero, method 800 can advance to 840.

Method 800, at 840, can comprise determining a chunk 'Z'. Chunk Z can be a convolved chunk based on a chunk 'Y', a chunk 'X', etc. Chunk Y can have a valency 'Y1', chunk X can have a valency 'X1', etc. In an aspect, Y1 and X1 can be different values, e.g., chunk Z can be a mismatched valency chunk such as chunk Z [Z1, Y1*, X1*, . . . ]. For clarity and brevity, hereinafter chunk Z can be regarded as the convolution of chunk X [X1] and chunk Y [Y1] and Y1<X1, such that chunk Z can be written as chunk Z [Y1−1, X1*] in accord with the present disclosure nomenclature.

At 850, method 800 can comprise determining if A1=Y1. If A1 is not equal to Y1, method 800 can convolve chunk A with another chunk 'B' to generate chunk AB, wherein the valency of chunk AB=AB1=MIN(A1, B1)−1. At this point, method 800 can end. In an aspect, a valency of chunk B can preferably be considered, e.g., a chunk B can be sought where A1=B1, e.g., as is noted elsewhere herein, it can be preferable to convolve chunks with matching valencies. However, method 800, at 850, can convolve chunk A with chunk B even where A1 is not equal to B1. In some atypical conditions B1 can even be a zero valency, although as also is disclosed elsewhere herein, this convolution is generally disfavored and to be used sparingly, if at all. In some embodiments, if a matching valency chunk B cannot be determined, then method 800 can end without convolving chunk A. Turning now to where, at 850, A1 is equal to Y1, method 800 can advance to 870.

At 870, method 800 can comprise deconvolving chunk Z. At this point, method 800 can end. In a general aspect, e.g., where chunk Z can be based on more than two participating chunks, can be based in part on an already convolved chunk, etc., deconvolving chunk Z can yield at least chunk Y. However, as is noted hereinabove, where chunk Z is being treated as a convolution of only chunk X and chunk Y, then deconvolving chunk Z can yield both chunk X and chunk Y. Accordingly, method 800, at 880, can comprise convolving chunk A with chunk Y to generate chunk 'AY'. Chunk AY can be assigned valency 'AY1' wherein AY1=MIN(A1, Y1)−1.

In an aspect, method 800 can enable reconvolving chunks, as is disclosed herein. Reconvolving can comprise deconvolving mismatched valency chunks to allow new convolutions of the resulting parts with other matching chunks. In an aspect, matching valencies of convolved chunks can facilitate more complete performance of levels of convolution in accord with the corresponding valencies. As an example, chunk T [1] and chunk U [INF] can be convolved in to chunk TU [0, INF*], but this can truncate the infinite levels of convolution afforded to chunk U based on the single level of convolution associated to chunk T. As such, it can be desirable to reconvolve chunk TU [0, INF*] with another chunk, for example, chunk R [INF], wherein chunk TU can be deconvolved into chunk T [1] and chunk U [INF], where after chunk R [INF] can be convolved with chunk U [INF] to yield chink RU [INF], e.g., chunk TU [0, INF*] and chunk R [INF] can be reconvolved into chunk T [1] and chunk RU [INF]. In this example, two chunks of space are consumed before and after reconvolution. Moreover, in this example, before reconvolution chunk TU could not be further convolved with other chunks, however, after reconvolution both chunk T [1] and chunk RU [INF] can be further convolved with other chunks which can facilitate further storage space conservation, etc.

Figure 9:
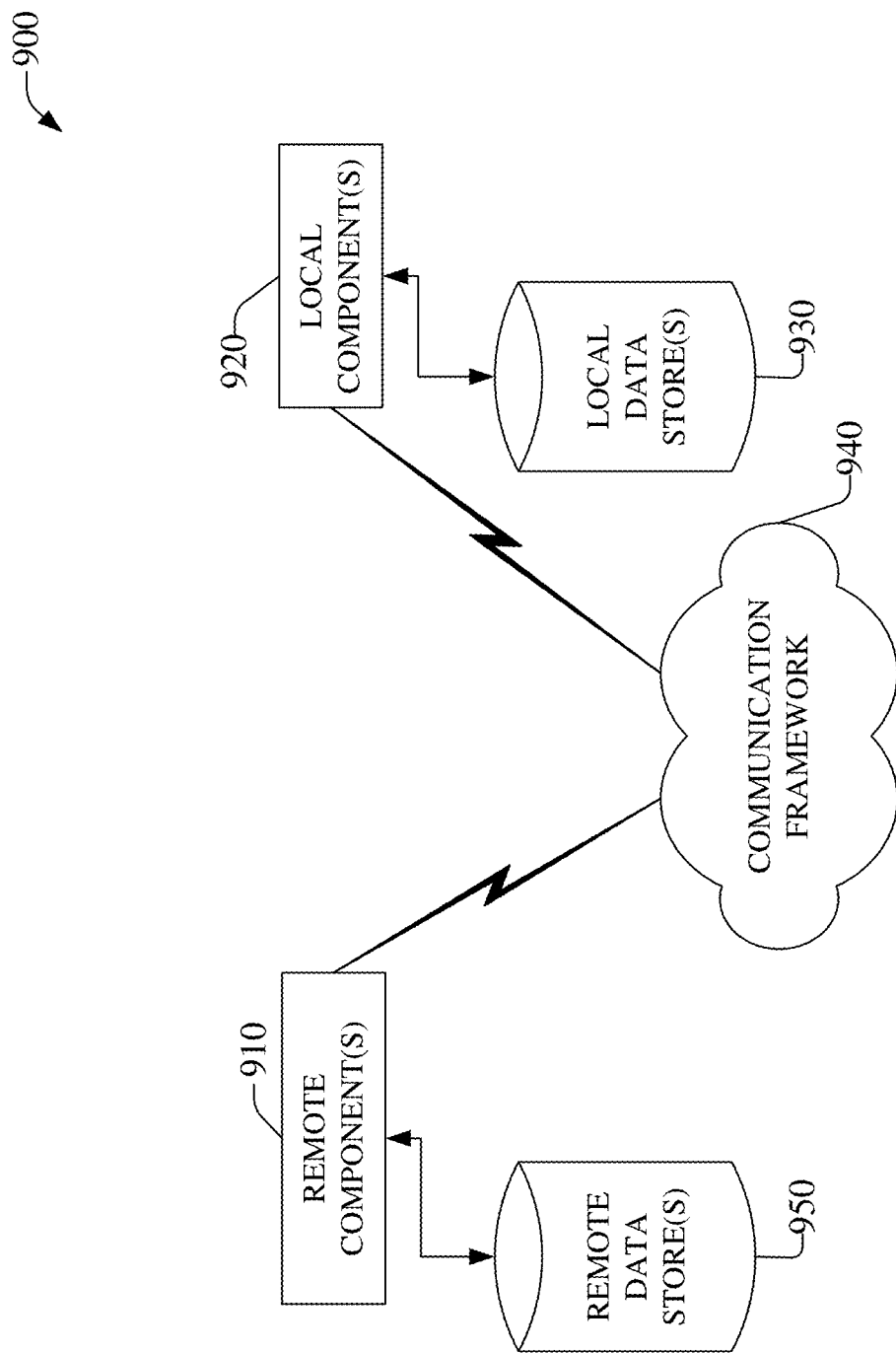
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via communication framework 940. In an aspect the remotely located ZSC or local ZSC can be embodied in one or more of ZSC 110-130, 210-230, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, information corresponding to chunks stored on ZSCs can be communicated via communication framework 940 to other ZSCs of a storage network, e.g., to facilitate compression and storage in partial or complete chunks on a ZSC as disclosed herein.

Figure 10:
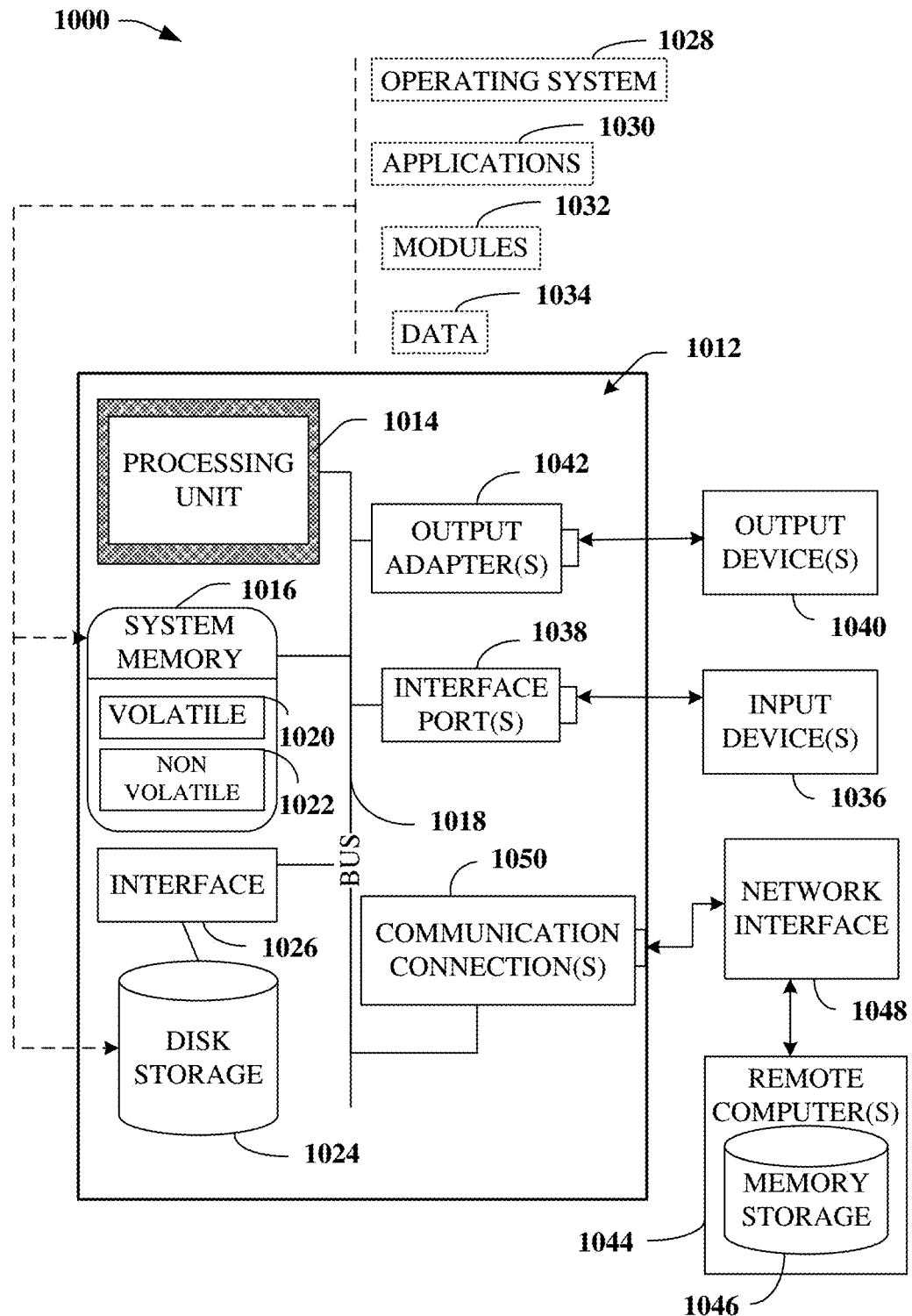
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a ZSC, e.g., ZSC 110-130, 210-230, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising receiving a first valency of a first chunk stored via a geographically distributed data storage system and receiving a second valency of a second chunk stored via the geographically distributed data storage system, and in response to determining that the first valency is a non-zero valency, generating a third chunk that is a convolution of the first chunk and the second chunk, and determining a third valency for the third chunk and restricting generation of the third chunk to a transient convolution of the first chunk and the second chunk where the first valency is a zero valency, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
   determining a first valency of a first chunk stored via a geographically distributed data storage system; and
   in response to determining that the first valency is a non-zero valency,
      selecting a second chunk stored via the geographically distributed data storage system, wherein the second chunk corresponds to a second valency, and
      enabling, based on the first valency and the second valency, generating a third chunk based on the first chunk and the second chunk.

2. The system of claim 1, wherein the third chunk is an exclusive-or convolution of the first chunk and the second chunk.

3. The system of claim 1, wherein the first valency is a first finite non-zero valency and the second valency is a second finite non-zero valency, and wherein a third valency of the third chunk is equal to less than the first valency.

4. The system of claim 3, wherein the third valency is equal to the first finite non-zero valency minus one.

5. The system of claim 4, wherein the first valency and the second valency are a same finite non-zero valency.

6. The system of claim 4, wherein the first valency is less than the second valency.

7. The system of claim 6, wherein the operations further comprise:
   deconvolving the third chunk into the first chunk and the second chunk; and
   reconvolving the first chunk and a fourth chunk based on the first valency and a fourth valency corresponding to the fourth chunk.

8. The system of claim 1, wherein the first valency is a first finite non-zero valency and the second valency is an infinite valency, and wherein a third valency of the third chunk is a second finite non-zero valency equal to less than the first valency.

9. The system of claim 1, wherein the first valency is an infinite valency and the second valency is the infinite valency, and wherein a third valency of the third chunk is the infinite valency.

10. The system of claim 1, wherein operations further comprise:
   in response to determining that the first valency is a zero valency,
   restricting, based on the first valency, generation of a third chunk based on convolving the first chunk and another chunk.

11. The system of claim 10, wherein the restricting permits transient convolution of the first chunk and the other chunk.

12. A method, comprising:
   in response to determining, by a system comprising a processor, that a first valency of a first chunk is a non-zero valency, wherein the first chunk is stored via a geographically distributed data storage system:
      selecting, by the system, a second chunk stored via the geographically distributed data storage system, wherein the second chunk corresponds to a second valency, and
      generating, by the system, a third chunk based on convolving the first chunk and the second chunk; and
   in response to determining, by the system, that a first valency is a zero valency, restricting generation of a third chunk based on convolving the first chunk and another chunk.

13. The method of claim 12, wherein the restricting limits the convolving of the first chunk and the other chunk to a transient convolution of the third chunk.

14. The method of claim 12, wherein the generating the third chunk is based on an exclusive-or convolving of the first chunk and the second chunk.

15. The method of claim 12, wherein the selecting the second chunk results in the second valency being an infinite valency.

16. The method of claim 12, wherein the generating the third chunk results in the third chunk having a third valency that is less than the first valency.

17. The method of claim 12, wherein the determining that the first valency results in determining that the first valency is an infinite valency, wherein the selecting the second chunk results in the second valency being the infinite valency, and wherein the generating the third chunk results in the third chunk having a third valency that is the infinite valency.

18. A machine-readable storage medium, comprising executable instructions that, when executed by a processor, facilitate performance of operations, comprising:
   receiving a first valency of a first chunk stored via a geographically distributed data storage system;
   receiving a second valency of a second chunk stored via the geographically distributed data storage system;
   in response to determining that the first valency is a non-zero valency, generating a third chunk that is a convolution of the first chunk and the second chunk, and determining a third valency for the third chunk; and
   in response to determining that the first valency is a zero valency, restricting generation of the third chunk to a transient convolution of the first chunk and the second chunk.

19. The machine-readable storage medium of claim 18, wherein:
   in response to the first valency being a non-infinite valency, the third valency of the third chunk is determined to be less than the first valency, and
   in response to the first valency being an infinite valency, the third valency of the third chunk is determined to be the infinite valency.

20. The machine-readable storage medium of claim 19, wherein a third valency of the third chunk is determined as a function of MIN(first valency, second valency)−1.

* * * * *